United States Patent [19]

Rampe

[11] Patent Number: 4,946,427
[45] Date of Patent: Aug. 7, 1990

[54] COMPOSITE ROTARY DRIVE MEMBER AND METHOD OF ITS FORMATION

[75] Inventor: John F. Rampe, Bratenahl, Ohio

[73] Assignee: Jepmar Research, Fairport Harbor, Ohio

[21] Appl. No.: 150,074

[22] Filed: Jan. 29, 1988

Related U.S. Application Data

[63] Continuation-in-part of Ser. No. 879,578, Jun. 27, 1986, Pat. No. 4,722,722.

[51] Int. Cl.$^5$ ............................................. F16H 55/14
[52] U.S. Cl. ..................................... 474/161; 29/892; 29/983; 29/984
[58] Field of Search .............................. 474/190–192, 474/161, 94, 902, 903; 29/159 R, 159.2, 159.3

[56] References Cited

U.S. PATENT DOCUMENTS

| | | | |
|---|---|---|---|
| 3,010,333 | 11/1961 | Rampe | 74/230.17 |
| 3,076,352 | 2/1963 | Larsh | 474/161 X |
| 3,200,665 | 8/1965 | Wells | 74/446 |
| 3,225,616 | 12/1965 | Whitehead | 74/449 |
| 3,272,027 | 9/1966 | Wayman | 74/243 |
| 3,361,004 | 1/1968 | Williams et al. | 74/434 |
| 3,830,577 | 8/1974 | Rampe et al. | 403/378 |
| 4,143,973 | 3/1979 | Hauser | 366/54 |
| 4,217,944 | 8/1980 | Pascal | 152/323 |

FOREIGN PATENT DOCUMENTS 94168 6/1982 Japan.

Primary Examiner—Thuy M. Bui
Attorney, Agent, or Firm—David A. Burge

[57] ABSTRACT

A composite rotary drive member such as a gear, pulley or the like is formed from thermoplastics material that is molded in situ about one or more metal inserts. A circumferentially extending drive formation of desired shape and size is defined by the molded plastics material, and is molded without a need for conventional measures to compensate for shrinkage. The drive member is formed by first forming a composite preform member that has injection molded thermoplastics material with peripheral portions extending about one or more metal inserts. A band-like ring of injection molded thermoplastics material is molded to extend contiguously and continuously about peripheral surface portions of the molded commposite preform member, with the plastics material of the band-like ring and of the composite preform member uniting to form a single plastics structure. Because the configuration of the drive surface is determined solely by the molding of the outer band-like ring of thermoplastics material, and because the band-like ring is so thin that it encurs a neglibible amount of shrinkage, wheels, gears, pulleys and the like of a very wide range of diameters and torque capacities can be formed inexpensively and accurately without a need to compensate for shrinkage.

72 Claims, 6 Drawing Sheets

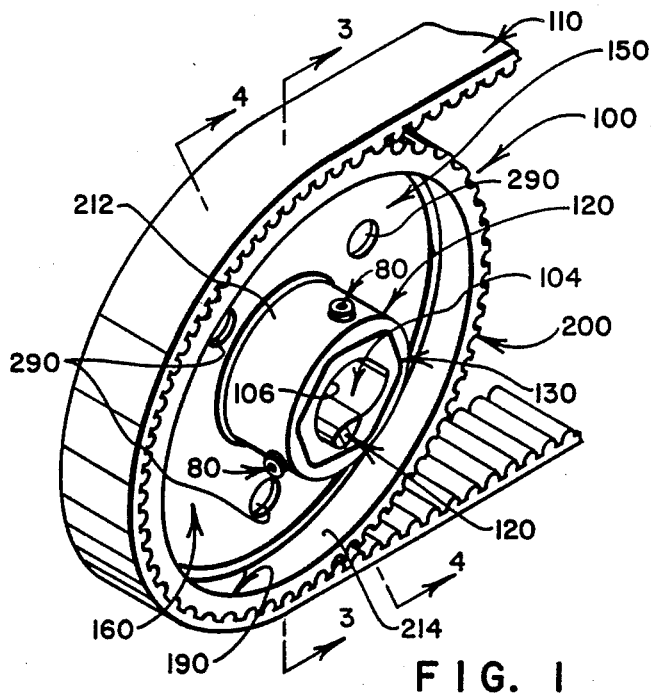
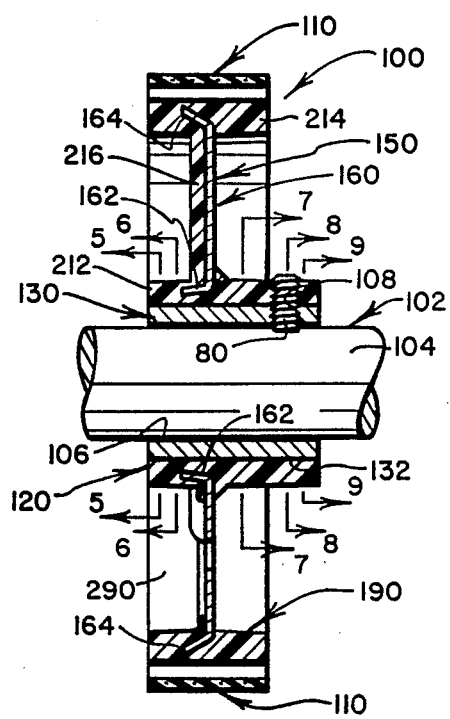
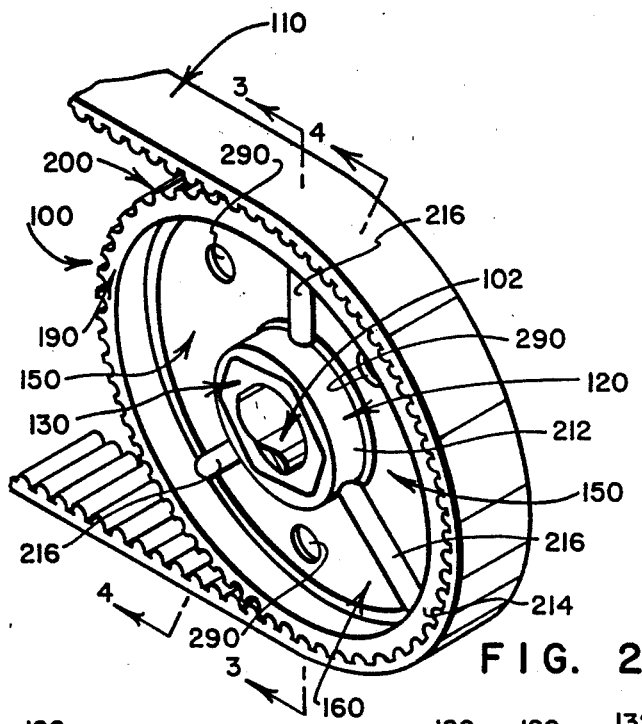
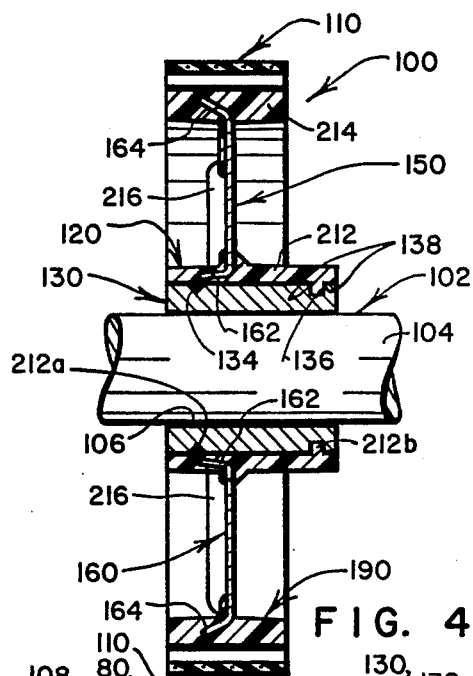
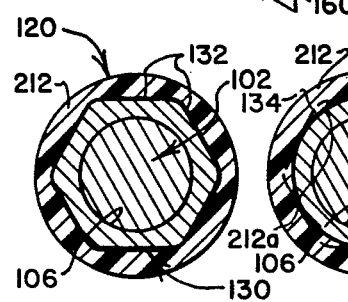
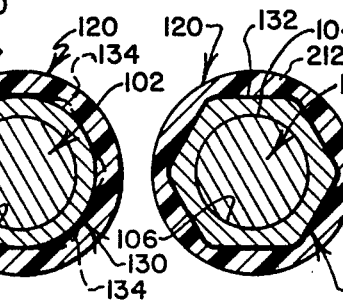
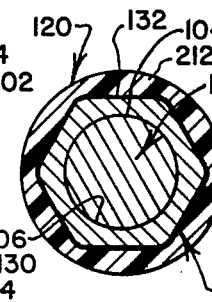
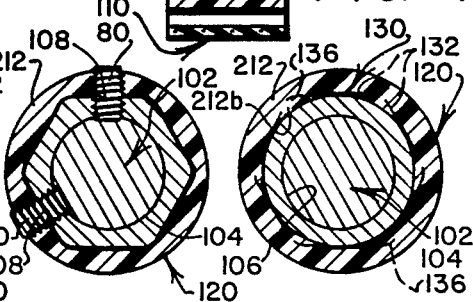
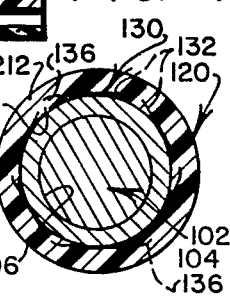

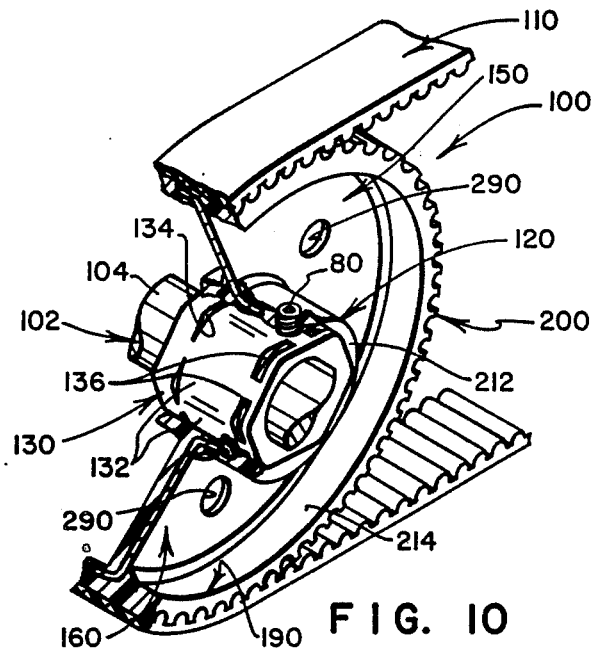
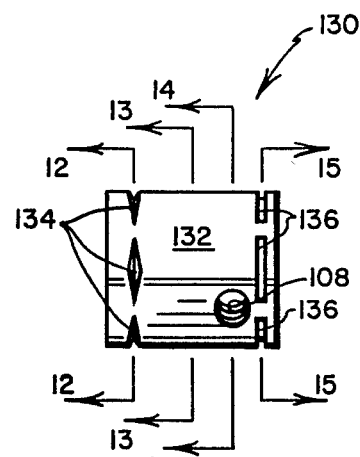
FIG. 10
FIG. 11
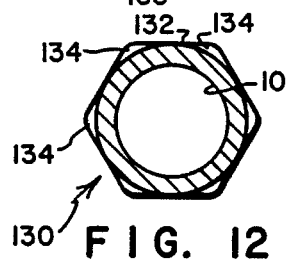
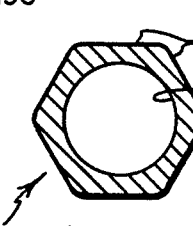
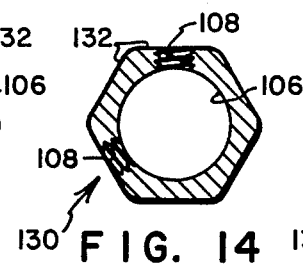
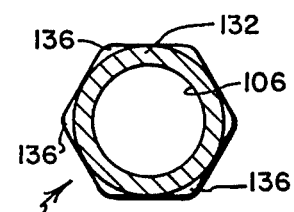
FIG. 12  FIG. 13  FIG. 14  FIG. 15
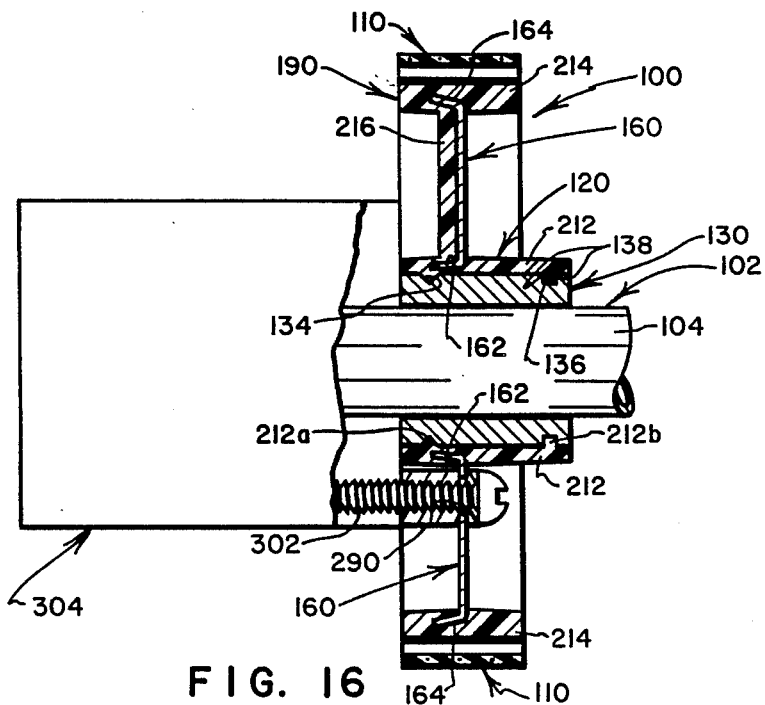
FIG. 16

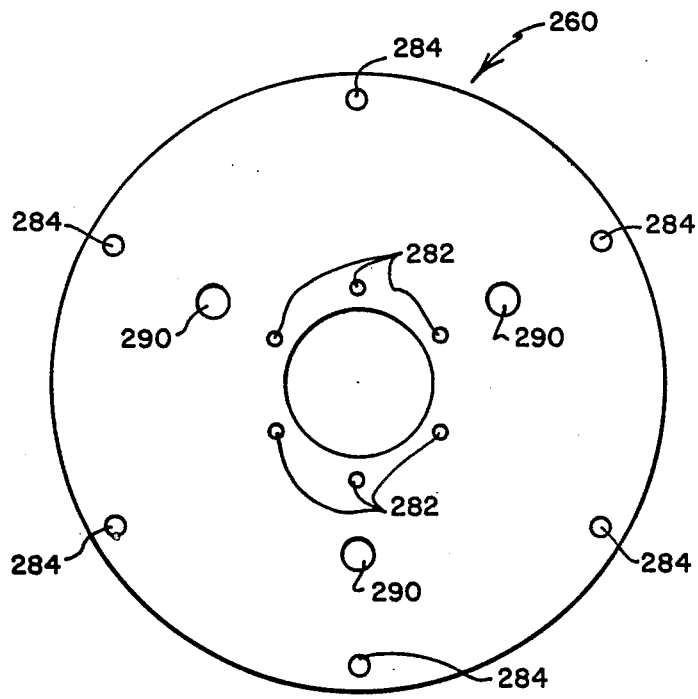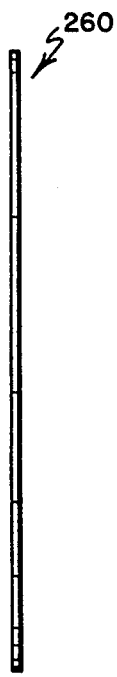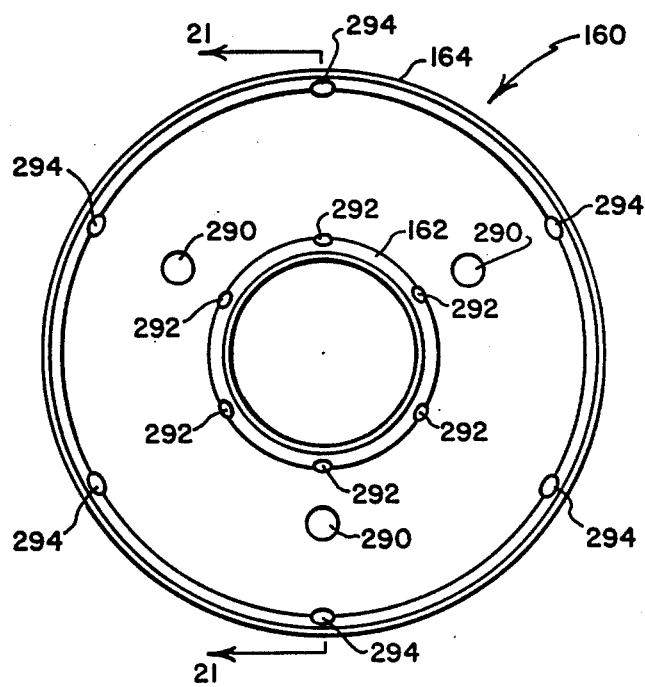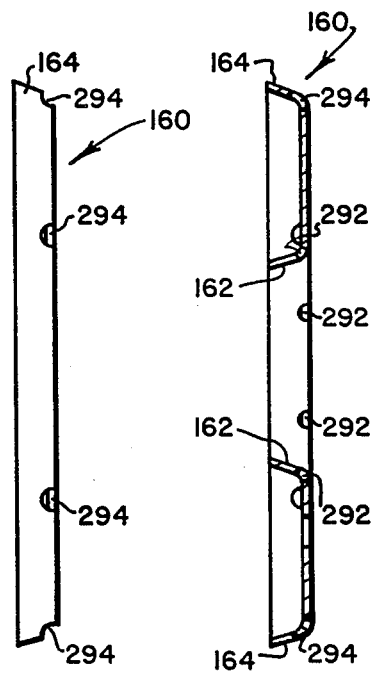
FIG. 17  FIG. 18  FIG. 19  FIG. 20  FIG. 21

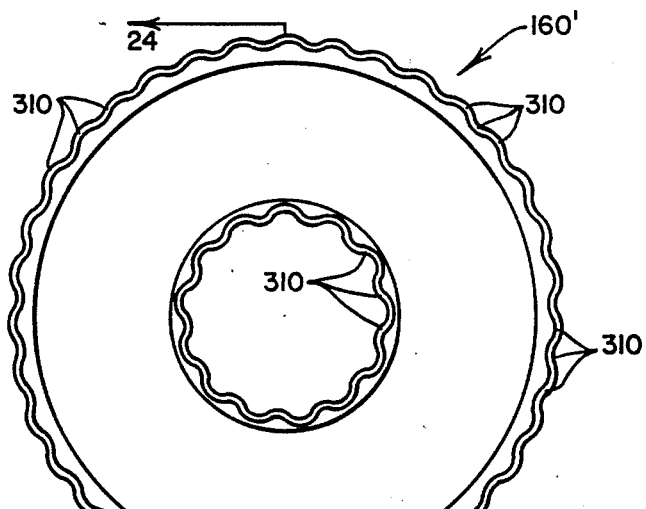
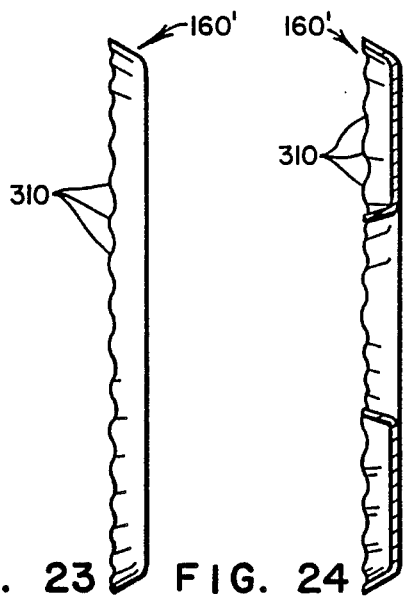
FIG. 22  FIG. 23  FIG. 24
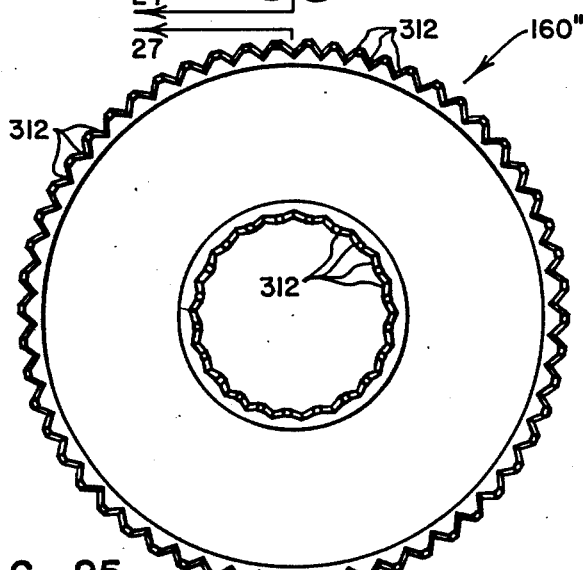
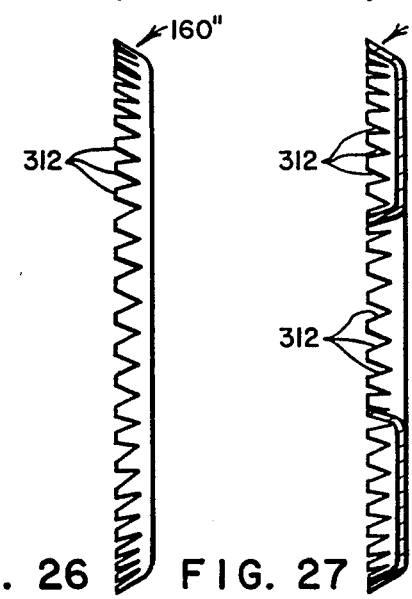
FIG. 25  FIG. 26  FIG. 27
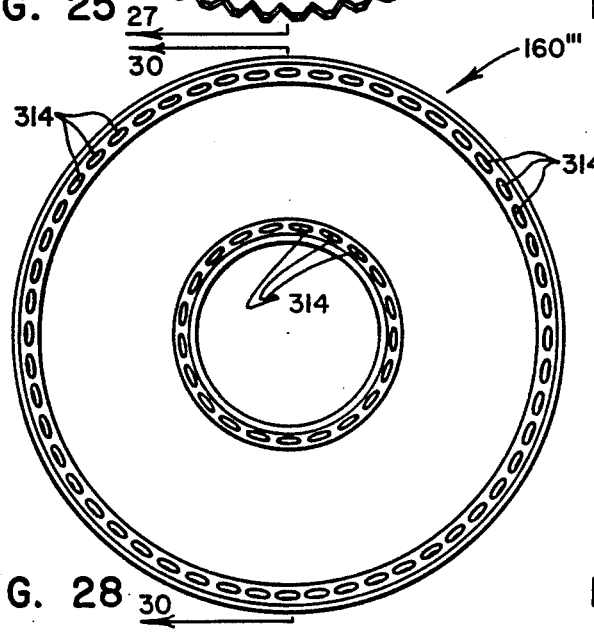
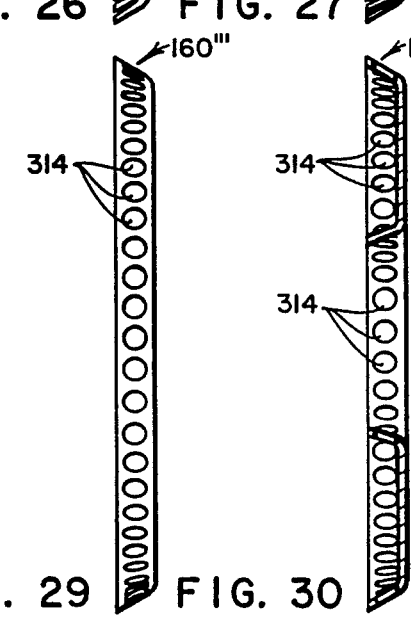
FIG. 28  FIG. 29  FIG. 30

COMPOSITE ROTARY DRIVE MEMBER AND METHOD OF ITS FORMATION

CROSS-REFERENCE TO RELATED APPLICATION

The present application is a continuation-in-part of co-pending application Ser. No. 879,578 filed June 27, 1986, issued Feb. 2, 1988 as U.S. Pat. No. 4,722,722 entitled ROTATABLE DRIVE MEMBER FORMED FROM INJECTION MOLDED PLASTICS MATERIAL WITH PREFORM INSERT, referred to hereinafter as the "Molded Pulley Patent," the disclosure of which is incorporated herein by reference.

BACKGROUND OF THE INVENTION

1. Field of the Invention

The present invention relates to a rotary drive member such as a wheel, pulley, gear or the like that has a circumferentially extending drive formation with features of desired shape and size that are formed by the injection molding of thermoplastics material, but without a need for conventional measures to compensate for shrinkage of the thermoplastics material. More particularly, the present invention relates to a composite rotary drive member that has a circumferentially extending drive formation wherein peripheral portions of the drive member are formed by dual stage molding of thermoplastics material to first form a composite metal and plastic preform member that is permitted to undergo normal shrinkage before a relatively thin, band-like ring of thermoplastics material is molded in place about the periphery of the composite preform to define the drive formation with drive surface features of desired shape and size, with the band-like ring being so thin that it encurs a negligible amount of shrinkage.

2. Prior Art

Rotary drive members such as wheels, pulleys, gears and the like that are mountable on a shaft or other structure for rotation typically have been formed either from metal or from injection molded thermoplastics material. Forming a rotary drive member from metal has the advantage of providing a strong, rigid structure that can be configured to transfer relatively large torque, for example between a shaft on which the drive member is mounted and another drive member such as a gear or an end-less belt that engages the rotary drive member. Forming a rotary drive member from injection molded thermoplastics material has the advantage of providing a relatively lightweight structure that often can be formed at a cost that is relatively low, compared to the price of machining the drive member from metal.

It also is known to form one or more parts of a rotary drive member such as a pulley from injection molded plastics material, and to use the molded part or parts in combination with one or more separately fabricated metal parts to provide a rotary drive member that is formed as an assembly of plastic and metal components.

3. The Referenced Molded Pulley Patent

The invention of the referenced Molded Pulley Patent provides a rotary drive member, such as a wheel, gear, pulley or the like, that is formed by injection molding thermoplastics material to envelop selected portions of at least one preform insert. The injection molding of the thermoplastics material is a one-step process, and mold components are used that are sized to allow for shrinkage of the molded thermoplastics material.

In the preferred practice of the invention of the Molded Pulley Patent, two preform inserts made of metal such as steel are inserted into an injection mold to form a rotatable drive member that is a composite plastic and metal structure. One of the metal preform inserts is a tubular sleeve that defines portions of a hub of the rotatable drive member. The other of the metal preform inserts is an annular disc that defines portions of a radially extending web that serves to rigidly connect hub and rim portions of the rotatable drive member. The injection molded plastics material envelopes peripheral portions of the tubular sleeve as well as inner and outer edge portions of the annular disc, and defines a drive formation on the rim of the drive member for engaging another drive member such as a gear or an endless belt.

A problem not addressed by the referenced Molded Pulley Patent is that of providing a system for molding composite metal and plastic wheels, gears, pulleys and the like without having to take conventional steps (such as the over-sizing of mold components) to compensate for shrinkage of the molded thermoplastics material. Because shrinkage is encurred in the injection molding of thermoplastics materials, with the extent of the shrinkage typically being within the range of about 0.001 to about 0.015 inches per inch, and with shrinkage tending to be greater as the thickness of the molded part is increased, the presence of shrinkage on a pulley of 8 inches in diameter that is molded from thermoplastics material can cause the pulley to diminish in size from its original molded configuration by typically about 0.150 inch unless care is taken to properly oversize the mold adequately to compensate for shrinkage. Moreover, in determining the extent to which mold portions must be oversized in order to properly allow for shrinkage, a mold designer must take into account a host of factors that influence the way in which a molded part of particular cross section will cool. For example, the presence of hot spots in molded thermoplastics material that require prolonged cooling time will significantly increase the shrinkage that will occur.

Because the problems that are encurred in providing molds that will properly and reliably allow for shrinkage can add quite significantly to the cost of producing molded thermoplastic components, those who are skilled in the art long have sought a molding technique that will permit parts such as wheels, gears, pulleys and the like to be molded without a need to take shrinkage factors into account, while still providing a capability to accurately form drive surface features of desired size and shape.

SUMMARY OF THE INVENTION

The present invention addresses the problem of and plastic, such as a wheel, pulley, gear, or the like, by providing a system that utilizes a dual-stage injection molding process to form peripheral portions of a composite drive member, with a circumferentially extending drive formation being defined solely by a band-like outer ring of plastics material that is so thin that the extent to which it experiences shrinkage is negligible.

In accordance with the process of the present invention, a rotary drive member is formed in a two-step molding process, beginning with the formation of a composite preform of metal and plastic, and concluding with the formation of a band-like ring of plastic that extends about and joins with the plastics material of the preform. By forming hub, web and inner peripheral portions of the drive member during a first injection molding step that creates a composite preform, and by forming outer peripheral portions including drive surface features during a separate second injection molding step (wherein thermoplastics material is molded about the peripheral portions of the preform), features of the drive surface can be accurately formed at a time after the bulk of the thermoplastics material that comprises the drive member has undergone shrinkage By this method, the shrinkage that is encurred as the result of the molding of the thin outer layer of material (the plastics material that defines features of a circumferentially extending drive formation) is so small as to be negligible.

Stated in another way, what the system of the present invention advantageously provides is (1) an inexpensive production method by which gears, pulleys and the like can be formed, and (2) products such as gears, pulleys and the like that are inexpensively formed by using the method. Two guiding concepts are of importance to the practice of the invention. One is that by forming composite metal and plastics structures, the cost of providing the overall structure is minimized while giving the resulting products the needed strength. The other is the use of a dual-stage molding process with intermediate shrinkage and with the last of the two stages being used to mold a thin, ring-like layer that encurs minimal shrinkage, whereby conventional steps to deal with shrinkage of molded thermoplastics material (and the attendant cost of these steps) can be avoided.

The dual-stage molding process that is employed in the preferred practice of the present invention forms radially inward and radially outward portions of a thermoplastics component of a composite metal and plastics rotary drive member such that the locus of the juncture between the radially inward and the radially outward portions of the thermoplastics component are carefully selected to maximize the amount of plastics material that is molded with the first of the two molding stages so that the remaining band-like ring of plastics material that is molded with the second of the two molding stages has the features of (1) being molded about the plastics material of the first molding stage at a time after the plastics material of the first molding stage has undergone its shrinkage, (2) being uninterrupted in character as it extends continuously and contiguously about peripheral portions of the plastics material of the first molding stage, and (3) having a minimal thickness, measured radially, that is held within the range of about 0.040 inch to about 0.090 inch. By closely holding the minimum radial thickness of the ring-like band to within a range of about 0.040 inch to about 0.090 inch, it has been determined that a proper unifying juncture is made between the plastics materials of the first and second stages while keeping the radial thickness of the band-like ring of material as thin as possible so as to minimize the shrinkage that it experiences.

Another concept that is believed to aid in assuring that the thermoplastics materials of the first and second molding stages properly unifies in the region of their juncture (so as to assure that the resulting rotary drive member has the strength that is provided by a single plastics component rather than the weakness that is characteristic of a pair of concentrically bonded plastics components) involves using thermoplastics materials for both stages of molding that are of very nearly the same or identical composition While using materials of identical composition is not essential, by keeping the compositions of the two thermoplastics materials as close to identical as possible, it is assured that, when these two materials are joined during the second molding stage, there is no line of demarcation in material composition in the resulting structure that extends along the location of juncture of the plastics materials of the first and second molding stages. A preferred material is glass fiber reinforced Nylon of about 33 percent fiber content that has a characteristic shrinkage within the range of about 0.006 to about 0.009 inches per inch. Such a material is sold by E.I. DuPont de Nemours & Company, Wilmington, Del., under a product designation that is well known to those skilled in the art, namely "Nylon 612."

In preferred practice, the system of the present invention is implemented as an improvement on the method of forming a composite metal and plastic rotary drive member that is described in the referenced Molded Pulley Patent. Stated in another way, the best mode known to the inventor for carrying out the preferred practice of the present invention is in the formation of composite metal and plastic gears, pulleys and the like that each are formed using a pair of metal inserts. However, the system of the invention is not limited in its application to the formation of rotary drive members that include a pair of metal inserts; rather, it can be used to form composite rotary drive members that include a single metal insert or a plurality of metal inserts, as will be described.

By the arrangement described above, a lightweight weight rotary drive member is formed quite inexpensively as a combination of molded plastics material and a preform metal insert or inserts, with the molded plastics material enveloping selected portions of the preform insert or inserts, and with the molded plastics material defining a periphery that has a drive formation thereon for engaging one or more other drive members.

A significant feature of the invention lies in the provision of a simple and inexpensive method for forming rotary drive members that are capable of transmitting relatively high torques, for example between shafts on which the rotary drive members are mounted and drive elements that engage the drive formations which are provided on the rims of the rotary drive members.

A further feature of the present invention is its particularly advantageous use in the formation of toothed pulleys for use with what are referred to as "timing belts⇌. A "timing belt" has an inner surface that is provided with a regularly spaced array of tooth formations which extend into grooves defined by similarly configured toothed outer surfaces that are provided on timing belt pulleys. The advantages found in timing belt drives (as compared with gear drives, V-belt drives, roller chain and sprocket drives, etc.) are relatively low cost, light weight construction, low noise, zero backlash, and no requirement for lubrication. Timing belt drives provide a positive drive without a need for high belt tension, and these drives have a long life as compared with V-belt drives Because timing belt drives feature these and other advantages, they are being utilized to an increasing degree to replace other kinds of drives. The system of the present invention has particular value because it provides a means for forming timing belt pulleys of almost any useful size (extending from a fraction of an inch in diameter to a diameter of several feet), and because it can be utilized to form timing belt pulleys that are capable of transmitting as much as 15 to 20 horsepower and more.

BRIEF DESCRIPTION OF THE DRAWINGS

These and other features, and a fuller understanding of the invention may be had by referring to the following description and claims, taken in conjunction with the accompanying drawings, wherein:

FIG. 1 a perspective view showing one side of a first form of a rotary drive member that embodies the preferred practice of the present invention, with the rotary drive member having a hub portion that is mounted on a shaft, and having a rim portion that defines a toothed drive formation which is shown in driving engagement portions of a toothed endless timing belt;

FIG. 2 is a perspective view of the components of FIG. 1 showing opposite side portions of the rotary drive member;

FIGS. 3 and 4 are sectional view as seen from planes indicated by lines 3—3 and 4—4 in FIGS. 1 and 2;

FIGS. 5, 6, 7, 8 and 9 are sectional views as seen from planes indicated by lines 5—5, 6—6, 7—7, 8—8 and 9—9 in FIG. 3;

FIG. 10 is a perspective view similar to FIG. 1 but with portions of the rotary drive member and the timing belt being broken away;

FIG. 11 is a side elevational view of a preform sleeve-like insert that is utilized in the rotary drive member of FIG. 1-10;

FIGS. 12, 13, 14 and 15 are sectional views as seen from planes indicated by lines 12—12, 13—13, 14—14 and 15—15 in FIG. 11;

FIG. 16 is a sectional view similar to FIG. 3 but showing how other adjacent rotary mechanisms can be fastened to exposed metal web portions of the rotary drive member for rotation therewith;

FIG. 17 is a side elevational view of a blank of metal from which a preform disc-like insert of the type utilized in the rotary drive member of FIGS. 1-10 can be formed;

FIG. 18 is an end elevational view thereof;

FIG. 19 a side elevational view of a disc-like preform metal insert of the type utilized in the rotary drive member of FIGS. 1-10;

FIG. 20 end elevational view thereof;

FIG. 21 a sectional view as seen from a plane indicated by a line 21—21 in FIG. 19;

FIG. 22 is a side elevational view of an alternate embodiment of a preform disc-like metal insert;

FIG. 23 is an end elevational view thereof;

FIG. 24 a sectional view as seen from a plane indicated by a line 21—21 in FIG. 22;

FIG. 25 a side elevational view of still another alternate embodiment of a preform disc-like metal insert;

FIG. 26 is an end elevational view thereof;

FIG. 27 is a sectional view as seen from a plane indicated by a line 27—27 in FIG. 25;

FIG. 28 is a side elevational view of still another alternate embodiment of a preform disc-like metal insert;

FIG. 29 is an end elevational view thereof;

FIG. 30 is a sectional view as seen from a plane indicated by a line 30—30 in FIG. 28;

DESCRIPTION OF THE PREFERRED EMBODIMENT

Figure 31:
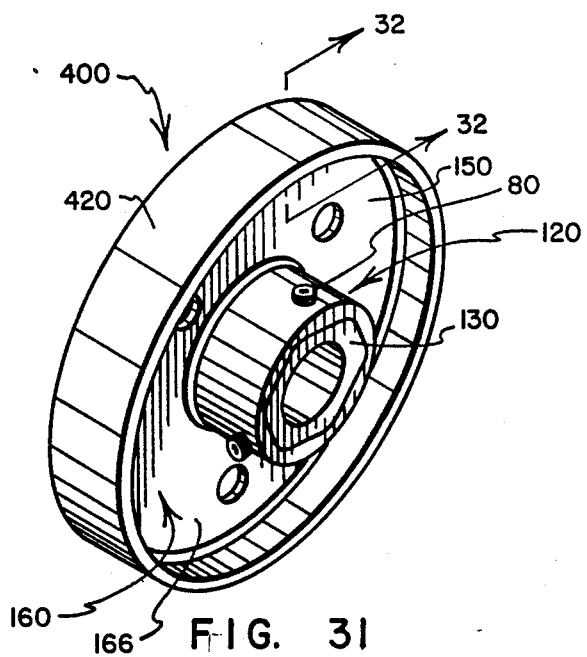
FIG. 31 is a perspective view of a composite preform that is injection molded during the preferred method of forming the rotary drive member of FIG. 1.

Because the best mode known for carrying out the practice of the present invention relates to an improved method for forming a rotary drive member of the type that is described in the referenced Molded Pulley Patent, what is depicted in FIGS. 1-30 has close correspondence to what is depicted in FIGS. 1-30 of the referenced Molded Pulley Patent. Likewise, the description below that refers to FIGS. 1-30 bears close resemblance to the description that is presented in the referenced Molded Pulley Patent in conjunction with FIGS. 1—30 thereof.

Referring to FIGS. 1—4, a rotary drive member in the form of a timing belt pulley 100 is shown that embodies features of the preferred practice of the present invention. The timing belt pulley 100 is depicted as being mounted on a shaft 102. The shaft 102 has an outer surface 104 of essentially constant diameter that extends through a hole 106 that is formed centrally through the pulley 100. Portions of an endless timing belt 110 are shown reeved around peripheral portions of the pulley 100.

In overview, the pulley 100 includes a generally tubular hub 120 that defines the through-hole 106 that receives the shaft 102. Set screws 80 are threaded through holes 108 that are formed in the hub 120, with inner end regions of the set screws 80 being tightened into engagement with the outer surface 104 of the shaft 102 for connecting the pulley 100 securely to the shaft 102. The pulley 100 additionally includes an annular web 150 that is of relatively thin cross section and that extends radially outwardly from the hub 120. A ring-like rim 190 connects with and surrounds the periphery of the web 150. The rim 190 defines a drive formation 200 that is shown as taking the form of a toothed outer circumference that is configured to mate with and drivingly engage another drive member such as a gear (not shown) or the endless timing belt 110.

Selected structural portions of the pulley 100 are defined by a pair of preform metal inserts 130, 160. Specifically, a tubular, sleeve-like inner insert 130 is loosely surrounded by an annular, disc-like outer insert 160. The inner insert 130 is preferably formed as a cutoff length of tubular steel stock which is preformed to provide the central mounting hole 106 and a generally hexagonal outer surface 132. The outer insert 160 is preferably formed by stamping a flat blank of sheet metal stock (designated by the numeral 260 in FIGS. 17 and 18) to give the outer insert 160 the desired annular configuration (shown in FIGS. 19–21), and to cause radially inner and outer edge portions 162, 164 of the insert 160 to be bent out of the plane of the majority of the material of the insert 160 which forms a central web 166.

Referring to FIG. 3, portions of the inserts 130, 160 are enveloped by plastics material which is designated generally by the numeral 210. Specifically, the outer surface 132 of the sleeve-like inner insert 130 is surrounded and enveloped by plastics material that is designated by the numeral 212, while the radially inner and outer edge portions 162, 164 of the insert 160 are surrounded and enveloped by plastics material that is designated by the numerals 212, 214 respectively. Additionally, three spokes of plastics material 216 (see FIG. 2) extend along one side of the outer insert 160 to interconnect the plastics material 212, 214 that surrounds the inner and outer edge portions of the insert 160.

The method by which the combination metal and plastic pulley 100 is formed in accordance with the system of the present invention will be discussed after features of the components described above are discussed in greater detail.

Referring principally to FIGS. 10 and 11, the sleeve-like inner insert 130 preferably is of substantially uniform cross section along its length except at two axially spaced locations where ring-like arrays of short groove segments 134, 136 are formed in the outer surface. Referring to FIGS. 13 and 15 in conjunction with FIGS. 10 and 11, it will be seen that the groove segments 134 and 136 extend to substantially uniform depths However, as is best seen by referring to FIGS. 4 and 16, the groove segments 134 are of generally V-shaped configuration, while the groove segments 136 are of generally U-shaped configuration, with opposed side walls 138 of the groove segments 136 extending in parallel, spaced planes that orthogonally intersect the central axis of the elongate tubular sleeve-like inner insert 130.

Figure 35:
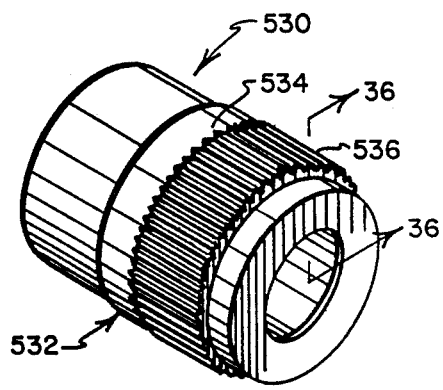
FIG. 35 is a perspective view of a metal preform that is used in an alternate form of rotary drive member that embodies features of the invention.

Referring to FIGS. 4, 6 and 9, the groove segments 134, 136 that are provided in the outer surface of the inner insert 130 are matingly engaged by correspondingly configured projections 212a, 212b that are formed by the plastics material 212 that envelops the outer wall of the inner insert 130. The mating engagement of the plastics material 212 that envelops the hexagonal-shaped outer surface of the tubular inner insert 130 establishes a rigid driving connection between the inner insert 130 and the surrounding plastics material 212. Moreover, the projections 212a, 212b of plastics material that extend into the groove segments 134, 136 enhance the rigid character of this driving connection and assure that the sleeve-like inner insert 130 will not move axially with respect to the surrounding plastics material 212. Other types of formations on the circumference of metal inserts can be used to establish rigid driving connections with surrounding plastics material, as will be understood by those skilled in the art. An example of another type of formation used on a metal insert is a knurled surface portion, which is illustrated in FIG. 35.

The outer, disc-like metal insert 160 is an annular structure that defines a radially-extending central web 166 which interconnects the inner and outer edge portions 162, 164 that have been bent as by stamping to extend out of the plane of the central web 166. The inner and outer edge portions 162, 164 of the stamped disc-like outer insert 160 preferably define a plurality of circumferentially spaced anchor formations that serve to enhance the rigidity and secure nature of the driving connection that is established between the inner and outer edge portions 162, 164 and the enveloping plastics material 212, 214.

Referring to FIGS. 17 and 18, a flat blank of sheet metal 260 is shown from which the disc-like outer insert 160 is formed. The blank 260 can be formed from substantially any selected gage thickness of commercially available sheet metal, with galvanized steel of about 12 or 14 gage being appropriate for use in forming most pulleys having an outer diameter of about 2 inches to about 6 inches. Thicker sheet stock is preferred for use with larger diameter pulleys, with 10 gage being sufficiently thick for use with most large diameter pulleys. Thinner sheet stock is preferred for use with pulleys of very small diameter, with the thickness of the sheet stock being scaled down in accordance with the diameter of the pulley, whereby 20 or 22 gage sheet stock is usually appropriate in forming pulleys of less than an inch in diameter.

Anchoring formations for securing inner and outer end regions of the disc-like outer insert 160 to the enveloping plastics material are preferably formed either in stamping the blank 260 to define its preliminary configuration as is depicted in FIGS. 17 and 18, or in stamping the blank 260 to form its final configuration as is depicted in FIGS. 19–21. In FIGS. 17–18, it will be seen that inner and outer rings of holes 282, 284 are formed through the material of the blank 260 in defining the blank's preliminary configuration. The holes 282, 284 are deformed during the final stamping of the blank 260 to define trough-like notches 292, 294 that straddle lines of juncture between the planar central portion 166 of the disc-like outer insert 160 and the inner and outer edge portions 162, 164. These anchoring formations 292, 294 are caused to be filled by plastics material 212, 214 when the inner and outer edge portions 162, 164 are enveloped by injection molded plastics material, as will be explained shortly, whereby very secure driving connections are established between the inner and outer edge portions 162, 164 and the enveloping plastics material 212, 214.

Referring to FIG. 17, additional holes 290 may be formed in a symmetrical array about the center of the blank 260, with the symmetrical arrangement of these holes being desirable in order to preserve the balance of the resulting pulley 100. As is typically illustrated in FIG. 16, a threaded fastener such as a cap screw 302 can be inserted through each of the holes 290 to secure the pulley 100 to adjacent rotary elements, as designated by the numeral 304.

FIGS. 22–24, 25–27 and 28–30 illustrate three other typical embodiments 160', 160", and 160''' that can be utilized in place of the previously described embodiment 160 of the outer insert. The embodiment 160' of FIGS. 22–24 has inner and outer edge portions that define wave-like anchoring formations 310 that project into the enveloping plastics materials 212, 214 at varying angles to establish secure driving connections. The embodiment 160', of FIGS. 25–27 has inner and outer edge portions that define notched anchor formations 312 that are engaged by the enveloping plastics materials 212, 214 to establish secure driving connections. The embodiment 160''' of FIGS. 28–30 has arrays of holes 314 that are formed through the inner and outer edge portions, into which the enveloping plastics materials 212, 214 enter to establish secure driving connections. As will be apparent to those skilled in the art, other types, kinds and combinations of formations can be used to provide suitable means to anchor the inner and outer edge portions of the disc-like outer insert to the enveloping plastics material.

The preferred method by which a rotary drive invention is formed employs a two-stage injection molding process. In FIGS. 31–34, features of the method are illustrated in conjunction with the formation of the rotary drive member 100 of FIG. 1. In FIGS. 35–40, features of the method are illustrated in conjunction with the formation of another rotary drive member embodiment 500 that is shown in FIG. 39.

Figure 32:
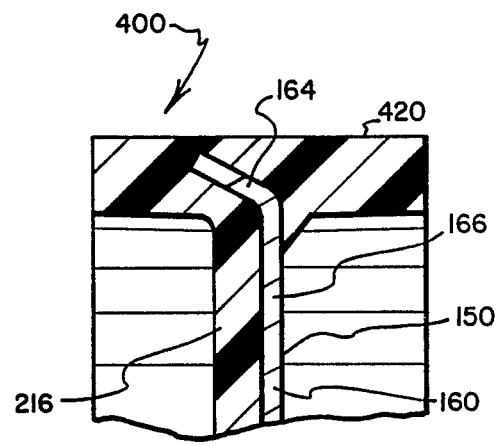
FIG. 32 is a sectional view, on an enlarged scale, as seen from a plane indicated by a line 32—32 in FIG. 31.
Figure 33:
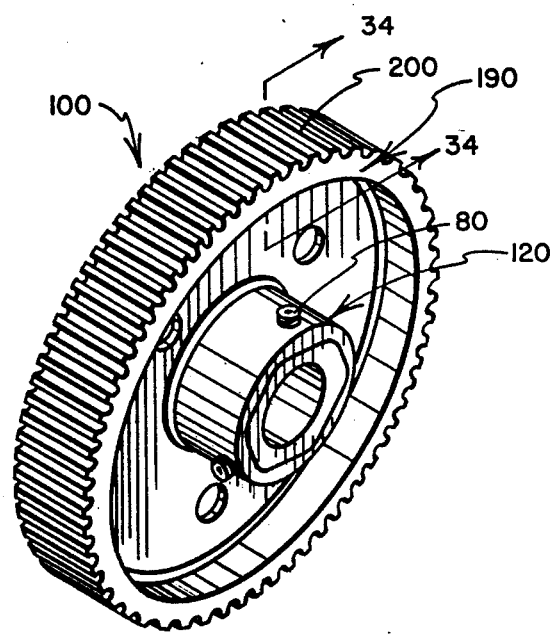
FIG. 33 is a perspective view of the rotary drive member of FIG. 1 that is formed by injection molding rim portions that define a rotary drive formation about the periphery of the composite preform of FIG. 31.

Referring to FIGS. 31–34, the preferred method of forming the rotary drive member 100 begins with a first injection molding stage wherein a composite preform member is molded, as is designated in FIGS. 31 and 32 by the numeral 400. After the thermoplastics material of the composite preform 400 has undergone the shrinkage that follows its being molded, it has an outer peripheral surface 420 of a diameter that is less than the diameter of any part of the drive formation 200. A second injection molding stage is utilized to provide a band-like ring of plastics material, as is designated in FIG. 34 by the numeral 410.

Figure 34:
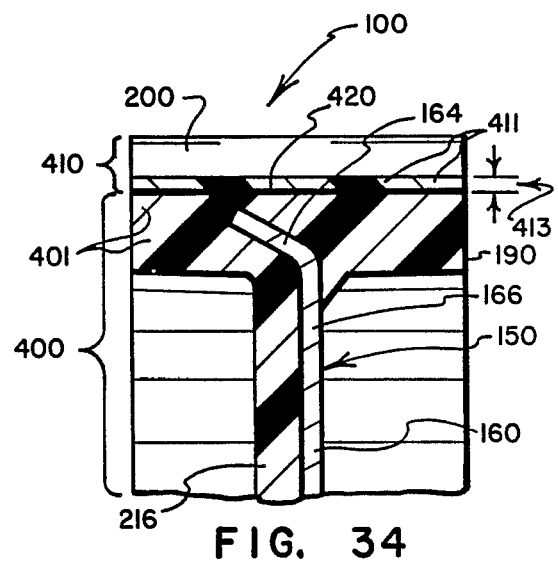
FIG. 34 is a sectional view, on an enlarged scale, as seen from a plane indicated by a line 34—34 in FIG. 33.

While the band-like ring 410 is depicted in FIG. 34 by section lines 411 that are inclined relative to section lines 401 that designate the plastics material of the composite preform 400, it will be understood that the band-like ring of thermoplastics material 410 is molded about the periphery of the thermoplastics material of the composite preform 400 so as to intimately, continuously and contiguously engage the outer surface 420 of the preform 400, and so that the thermoplastics material of the ring 410 unifies with the thermoplastics material of the composite preform 400 to form the single molded body of thermoplastics material that has been described in conjunction with the foregoing discussion that is associated with FIGS. 1–30.

Figure 40:
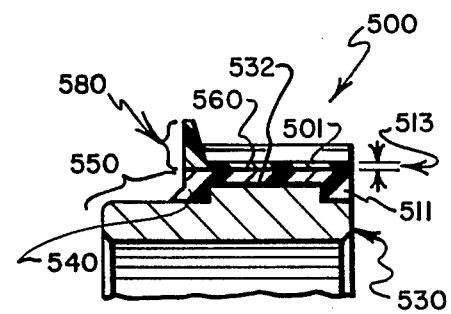

Stated in another way, although section lines 401, 411 that are oriented at differing angles are employed in FIG. 34 (to enable the material of the ring 410 to be distinguished from the material of the composite preform 400), it will be understood that the section lines 401, 411 are intended quite simply to designate nothing more than portions of the same one-piece unified body of plastics material The same applies to the section lines 501, 511 that are employed in FIG. 40 to illustrate portions of a single unified body of plastics material that forms a component of the rotary drive member 500.

The majority of the shrinkage in diameter that is encurred in the molding of all of the plastics material that is incorporated in the rotary drive member 100 takes place when the composite preform 400 is molded — the significance of which is that, when the band-like ring 410 is molded about the preform 400, a mold (not shown) that is configured to define surface features of substantially the actual desired size that are to be molded in forming the drive formation 200 can be used (without a need to take into account the effects of shrinkage of the plastics material of the band-like ring 410). The reason that shrinkage can be ignored in the molding of the band-like ring 410 is because the thickness of the plastics material that defines the features that are of most critical dimension is so thin that the extent of the shrinkage that results in the vicinity of the formation of the features that are of most critical dimension is of negligible magnitude.

Referring to FIGS. 31 and 32, the composite preform 400 is formed by inserting such metal preform inserts as are to be enveloped by plastics material (namely the inserts 130, 160) into a mold (not shown) that has a cavity which defines an outer surface diameter 420 that is smaller in diameter than is the smallest diameter portion of the drive formation 200, whereby the formation of the composite preform 400 leaves the circumferentially extending drive formation 200 to be molded by a subsequent molding process or stage. Because the mold cavity that is used to provide the composite preform 400 need not provide the preform 400 with a peripherally extending surface 420 that is of any especially critical size or shape, there is no need in the molding of the preform 400 to compensate for radially inward plastics material shrinkage. However, in sizing the mold that forms the surface 420, care should be taken to assure that, after the plastics material of the composite preform member 400 undergoes the shrinkage that occurs following its molding, the minimum radially measured thickness of the band like ring of material 410 that needs to be molded to define the minimum diameter of the drive formation 200 lies within the range of about 0.040 inch to about 0.090 inch, as is described elsewhere herein.

As the composite preform 400 is molded, opposite ends of the sleeve-like inner insert 130 are closed off by opposite side portions of the mold cavity; likewise, such side surface areas of the annular disc-like outer insert 160 as are to be exposed (i.e., not covered by overlying plastics material) are directly engaged by portions of the structure that define the mold cavity, whereby no plastics material is caused to flow along these side surface areas. The gates that feed molten plastics material into the mold during the injection molding process preferably communicate with such mold cavity portions as define the radially extending spokes 216 that interconnect the plastics material that surrounds the inner and outer edge regions 162, 164 of the disc-like outer insert member 160.

In injection molding the band of plastics material 410 that defines the drive formation 200 about the composite insert member 400, dimensions of the mold cavity need not be adjusted to accommodate for shrinkage of the plastics material as it cools. The reason for the absence of a need to allow for shrinkage is that, as the thin band-like formation of plastics material 410 that extends about the periphery of the composite insert member 400 is molded and cools, the shrinkage that ensues (at least in the vicinity of the formation of the features that are of most critical dimension) is so small in comparison to the overall diameter of the structure that is being molded that it is truly negligible, whereby the resulting part has dimensions that are well within the range of tolerances that are acceptable for the rotary drive member 100.

In preferred practice, the diameter of the outer surface 420 of the composite insert member 400 is selected so that the band of plastics material 410 that is molded about the preform 400 to provide the needed drive surface features has a minimum thickness, measured radially, of at least about 0.040 inch (so that the band of material 410 has a thickness that is sufficient to assure proper unification of the plastics material of the composite preform 400 and the band-like ring 410), and so that the minimum thickness, measured radially, is not greater than about 0.090 inch (so that the minimum thickness is kept as small as possible consistent with good molding results to minimize the shrinkage that is experienced by the ring of material 410 — and to especially minimize the shrinkage that occurs within the vicinities of the drive surface features that are of most critical dimension, namely the features that define the teeth of the drive formation 200).

Stated in another way, a restriction to be observed in carrying out the preferred method of forming the rotary drive member 100 is to make certain that the band of material 410 has a minimum thickness that assures integrity and longevity of service of the resulting molded part as by effecting proper unification with the plastics material that is injection molded to form the composite preform 400. The minimum thickness of the band 410, as measured at its thinnest point (e.g., as measured at the base of a groove that separates two adjacent teeth of the drive formation, and as is designated by the dimension 413 in FIG. 34), is within the range of about forty thousandths of an inch to about ninety thousandths of an inch. Experiments have shown that, by closely holding the minimum thickness of the ring-like band 410 to within a range of about 0.040 inch to about 0.090 inch, a proper unifying juncture is made between the plastics materials of the first and second molding stages (i.e., the stages wherein the composite preform 400 and the bandlike ring 410 are formed, respectively); and, by closely holding the minimum thickness of the band 410 to within the stated range, the band-like ring of material 410 is kept as thin as it can be kept while permitting the proper type of plastics material unification to take place along the juncture of the molded entities 400, 410, whereby the shrinkage that is encurred by the band-like ring of material 410 is minimized.

Referring to FIGS. 35-40, the manner in which an alternate type of rotary drive member 500 (see FIG. 39) is formed is illustrated. The principal difference between the rotary drive member 100 of FIG. 1, and the rotary drive member 500 of FIG. 39 is that, whereas the rotary drive member 100 includes a pair of coaxially positioned metal inserts, the rotary drive member 500 includes only one metal insert 530. Stated in another way, what is illustrated in FIGS. 35-40 is that the dual stage molding technique of the present invention can be used to form a circumferentially extending rotary drive formation about a composite preform that includes only a single metal insert.

Figure 36:
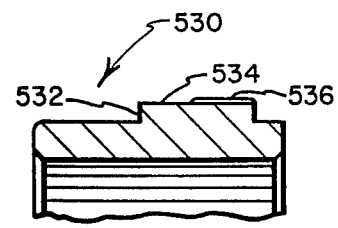
FIG. 36 is a sectional view as seen from a plane indicated by 36—36 in FIG. 35.

Referring to FIGS. 35 and 36, the single metal insert 530 that is employed in forming the rotary drive member 500 is a tubular, sleeve-like member that preferably is formed as a machined part that has an enlarged diameter portion 532 with an outer surface 534, a portion of which is knurled, as is indicated by the numeral 536. The knurled formation 536 helps to enhance the integrity of the driving connection that is established between the insert 530 and such plastics material 540 as envelops the enlarged diameter portion 532 of the insert 530.

Figure 37:
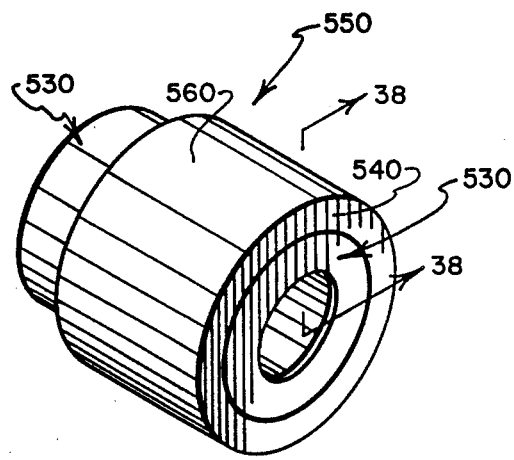
FIG. 37 is a perspective view of a composite preform that is injection molded during the preferred method of forming the alternate form of rotary drive member.
Figure 38:
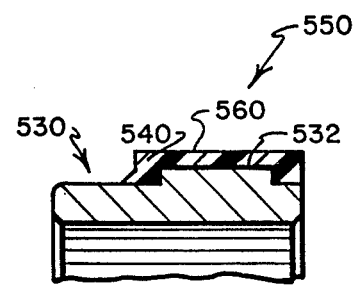
FIG. 38 is a sectional view as seen from a plane indicated by a line 38—38 in FIG. 37.
Figure 39:
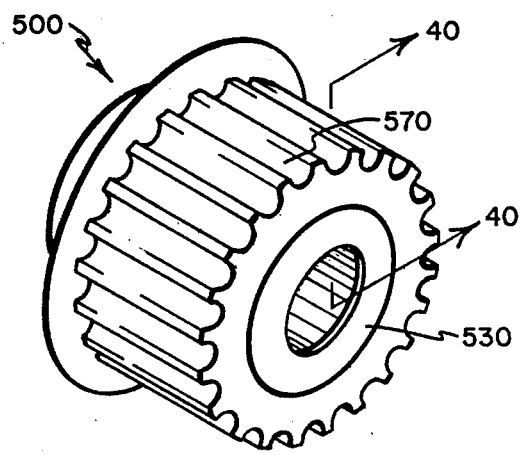
FIG. 39 is a perspective view of a rotary drive member that is formed by injection molding rim portions that define a rotary drive formation about the periphery of the composite preform of FIG. 37; and, FIG. 40 is a sectional view as seen from a plane indicated by a line 40—40 in FIG. 39.

Referring to FIGS. 37 and 38, a composite preform member 550 is formed by injection molding plastics material 540 about the enlarged diameter portion 532 of the metal insert 530 using a mold (not shown) that has a cavity that will provide the resulting composite preform 550 with an outer surface 560 that has a diameter which extends into close proximity to the base of such toothed drive features of a drive formation 570 that is to be formed as a part of the rotary drive member 500, but which leaves a suitably thick band-like ring 580 (see FIG. 40) of plastics material to be molded about the composite preform 550. The band-like ring 580 has a minimum thickness 513 that lies within the range of about 0.040 inch to about 0.090 inch, as has been described above.

Referring to FIGS. 39 and 40, in carrying out the final injection molding step that defines the circumferentially extending drive formation 570 surface as a part of the band-like ring 580 of plastics material that extends about the periphery of the composite preform 550, a mold (not shown) is used that has a cavity which is configured to substantially precisely form the desired size and shape of the drive formation 570 — which is to say that shrinkage of the drive surface features can be ignored as being negligible.

As will be apparent from the foregoing description, what the system of the present invention advantageously provides is (1) an inexpensive production method by which gears, pulleys and the like can be formed, and (2) products such as gears, pulleys and the like that are inexpensively formed by using the method. Two guiding concepts are of importance to the practice of the invention. One is that by forming composite metal and plastics structures, the cost of providing the overall structure is minimized while giving the resulting products the needed strength. The other is the use of a dual-stage molding process with intermediate shrinkage and with the last of the two stages being used to mold a thin, ring-like layer that encurs minimal shrinkage, whereby conventional steps to deal with shrinkage of molded thermoplastics material (and the attendant cost of these steps) can be avoided.

The dual-stage molding process that is employed in the preferred practice of the present invention forms radially inward and radially outward portions of a thermoplastics component of a composite metal and plastics rotary drive member such that the locus of the juncture between the radially inward and the radially outward portions of the thermoplastics component are carefully selected to maximize the amount of plastics material that is molded with the first of the two molding stages so that the remaining band-like ring of plastics material that is molded with the second of the two molding stages has the features of (1) being molded about the plastics material of the first molding stage at a time after the plastics material of the first molding stage has undergone its shrinkage, (2) being uninterrupted in character as it extends continuously and contiguously about peripheral portions of the plastics material of the first molding stage, and (3) having a minimal thickness, measured radially, that is held within the range of about 0.040 inch to about 0.090 inch regardless of the fact that the thickness may vary along the circumference of the ring-like band. By closely holding the minimum radial thickness of the ring-like band to within a range of about 0.040 inch to about 0.090 inch, it has been determined that a proper unifying juncture is made between the plastics materials of the first and second stages while keeping the radial thickness of the band-like ring of material as thin as possible so as to minimize the shrinkage that it experiences.

While a preferred range of minimum thickness for the ring-like band of material that is molded about the periphery of a composite preform during the second stage of a two-stage molding process has been described herein as being about 0.040 inch to about 0.090 inch, a more preferred range is between about 0.050 inch and 0.080 inch, for maintaining the minimum thickness within this more preferred range aids in assuring that, the,,resulting molded products are consistently of good quality, with proper unification of the plastics materials of the two molding stages, and with minimal shrinkage taking place in the molding of the ring-like band.

Another concept that is believed to aid in assuring that the thermoplastics materials of the first and second molding stages properly unifies in the region of their juncture (so as to assure that the resulting rotary drive member has the strength that is provided by a single plastics component rather than the weakness that is characteristic of a pair of concentrically bonded plastics components) involves using thermoplastics materials for both stages of molding that are of very nearly the same or identical composition. While using materials of identical composition is not essential, by keeping the compositions of the two thermoplastics materials as close to identical as possible, it is assured that, when these two materials are joined during the second molding stage, there is no line of demarcation in material composition in the resulting structure that extends along the location of juncture of the plastics materials of the first and second molding stages. A preferred material is glass fiber reinforced Nylon of about 33 percent fiber content that has a characteristic shrinkage of about 0.006 to about 0.009 inches per inch. Such a material is sold by E.I. DuPont de Nemours & Company, Wilmington, Del., under a product designation that is well known to those skilled in the art, namely "Nylon 612."

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A composite rotary drive member formed of metal and plastics components including at least one metal component that has mounting means defining at least portions of a mounting formation for mounting the composite rotary drive member for rotation about an axis of rotation, and including a component formed of plastics material that is molded so as to rigidly drivingly interconnect the metal and plastics components, with the plastics component including peripheral means having a peripheral portion extending coaxially about the axis of rotation for defining a circumferentially extending drive formation including drive features of desired shape and size for drivingly engaging another drive element as the rotary drive member rotates about the axis of rotation, and wherein the peripheral means is formed in a dual-stage injection molding process wherein a first injection molding of plastics material is utilized to provide a composite preform that includes plastics material that is molded about and rigidly connected to the at least one metal component, and that has peripheral surface portions that approach the location of but stop short of defining portions of the drive formation, and wherein a second injection molding of plastics material is utilized to provide the remainder of the portion and to define the drive formation so as to provide said drive features of desired shape and size, with the plastics material of the second molding including a band-like ring of plastics material that extends in an uninterrupted manner continuously and contiguously about the peripheral surface portions of the composite preform such that the plastics materials of the first and second injection moldings are united during the second molding to form a single component of plastics material, with the band-like ring of plastics material that is provided by the second molding being molded at a time after the plastics material of the first molding has undergone shrinkage that occurs during its solidification, and with the band-like ring of plastics material that is provided by the second molding having a minimum thickness that is within the range of about forty thousandths of an inch to about ninety thousandths of an inch.

2. The composite rotary drive member of claim 1 wherein the minimum thickness is within the range of about fifty thousandths of an inch to about eighty thousandths of an inch.

3. The composite rotary drive member of claim 1 wherein the peripheral surface portions of the composite preform define an outer surface of the composite preform that is substantially concentric about the axis of rotation.

4. The composite rotary drive member of claim 1 wherein the plastics materials that are used in the first and second moldings are substantially identical in composition so that when these materials are joined during the second molding to form a single plastics component, there is no line of demarcation in material composition that is marked by the location of the juncture of the plastics materials of the first and second moldings.

5. The composite rotary drive member of claim 4 wherein the plastics material that is used in the first and second moldings is glass fiber reinforced nylon.

6. The composite rotary drive member of claim 5 wherein the glass fiber reinforced nylon material has a shrinkage that is characteristically within the range of about six thousandths of an inch per inch to about nine thousandths of an inch per inch.

7. The rotatable drive member of claim 1 wherein the drive formation means includes drive surface means that is in the form of a toothed surface having a plurality of regularly spaced tooth means for drivingly engaging a matingly configured toothed drive formation on said another drive element.

8. The rotatable drive member of claim 7 wherein the drive surface means is configured to drivingly engage a toothed timing belt, and said another drive element is a toothed timing belt.

9. The rotatable drive member of claim 1 wherein the drive formation means includes drive surface means that is in the form of a toothed surface having a plurality of regularly spaced tooth means for drivingly engaging a matingly configured toothed drive formation on said another drive element.

10. The rotatable drive member of claim 7 wherein the drive surface means is configured to drivingly engage a toothed timing belt, and said another belt element is a toothed timing belt.

11. A composite rotary drive member formed of metal and plastics components including at least one metal component that defines at least portions of a mounting formation for mounting the composite rotary drive member for rotation about an axis of rotation, and a component formed of plastics material that is molded so as to rigidly drivingly interconnect the metal and plastics components, with a rim portion of the plastics component extending coaxially about the axis of rotation for defining a circumferentially extending drive formation of desired shape and size for drivingly engaging another drive element as the rotary drive member rotates about the axis of rotation, and wherein:

(a) such surface portions as define the drive formation extend no closer in proximity to the axis of rotation than a distance which will be referred to as a "first radius;" and, (b) the rim portion of the plastics component are formed in a dual-stage injection molding process wherein:

(i) radially inwardly located parts of the rim portion are formed as the result of a first injection molding of plastics material that forms a composite preform that includes plastics material that rigidly drivingly engages the at least one metal component, and that defines an outer surface that extends coaxially about the mounting formation at a substantially uniform distance from the axis of rotation, which distance will be referred to as a "second radius," with the second radius being selected such that it is less than the first radius by a distance that is within the range of about forty thousandths of an inch to about ninety thousandths of an inch;

(ii) the remainder of the rim portion is formed as the result of a second injection molding of plastics material that provides a band-like ring of plastics material that extends continuously and contiguously about, and is intimately bonded to, the outer surface of the composite preform with the result that the plastics material of the first and second injection moldings unit to form a single component of plastics material, with the bandlike ring of plastics material that is provided by the second molding being molded at a time after the plastics material of the composite preform has undergone shrinkage that occurs during its solidification, and with the plastics material of the second molding serving to define a drive surface of desired shape and size.

12. The composite rotary drive member of claim 11 wherein the second radius is selected such that it less than the first radius by a distance that is within the range of about fifty thousandths of an inch to about eighty thousandths of an inch.

13. The composite rotary drive member of claim 12 wherein the plastics material that is used in the first and second moldings is glass fiber reinforced nylon.

14. The composite rotary drive member of claim 11 wherein the plastics materials that are used in the first and second moldings are substantially identical in composition so that when these materials are joined during the second molding to form a single plastics component, there is no line of demarcation in material composition that is marked by the location of the juncture of the plastics materials of the first and second moldings.

15. The composite rotary drive member of claim 14 wherein the glass fiber reinforced nylon material has a shrinkage that is characteristically within the range of about six thousandths of an inch per inch to about nine thousandths of an inch per inch.

16. A rotatable drive member having a circumferentially extending drive surface that is formed from plastics material that is molded about portions of a composite preform structure that has been formed by molding plastics material about portions of at least one preform metal insert member which has been formed prior to the molding of the plastics material to provide a rigid drive member structure that consists of plastic and metal components that cooperate to define hub means including a hub portion of the drive member that can be mounted on a shaft for rotation about the axis of the shaft, and rim means including a rim portion of the drive member that extends concentrically about the hub portion at a location spaced radially with respect to the hub portion, the drive member comprising:

(a) a preform metal insert that comprises elongate tubular means formed from metal for defining at least a part of a hub portion of the rotatable drive member for mounting the drive member on a shaft for rotation about the axis of the shaft, and for defining outer surface formation means of non-circular cross section extending perimetrically about at least a part of the preform metal insert for drivingly engaging such plastics material as may be molded in situ about the outer surface formation means; and, (b) a one-piece plastic member that has been formed from plastics material in a two-stage injection molding process, with a first stage including the molding of plastics material in situ about the outer surface formation means of the preform metal insert and extending radially outwardly to define a generally cylindrical outer surface that is spaced radially inwardly from such features of a drive surface as are to be defined on the circumference of the drive member, and with a second stage including the molding of a band-like plastics formation that extends continuously and contiguously about the outer surface of the product of the first stage molding, with the band-like plastic's formation having a minimum thickness that is within the range of about forty thousandths of an inch to about ninety thousandths of an inch, with the plastics material of the band-like formation defining features of desired size and shape to form the circumferentially extending drive surface, and with the plastics material of the first stage molding enveloping outer surface formation means of the preform metal insert to establish a rigid driving connection between the plastics material and the metal insert.

17. The composite rotary drive member of claim 16 wherein the minimum thickness is within the range of about fifty thousandths of an inch to about eighty thousandths of an inch.

18. The composite rotary drive member of claim 16 wherein the peripheral surface portions of the composite preform define an outer surface of the composite preform that is substantially concentric about the axis of rotation.

19. The composite rotary drive member of claim 16 wherein the plastics materials that are used in the first and second moldings are substantially identical in composition so that when these materials are joined during the second molding to form a single plastics component, there is no line of demarcation in material composition that is marked by the location of the juncture of the plastics materials of the first and second moldings.

20. The composite rotary drive member of claim 19 wherein the plastics material that is used in the first and second moldings is glass fiber reinforced nylon.

21. The composite rotary drive member of claim 20 wherein the glass fiber reinforced nylon material has a shrinkage that is characteristically within the range of about six thousandths of an inch per inch to about nine thousandths of an inch per inch.

22. The rotatable drive member of claim 16 wherein the preform inner metal insert includes a sleeve-like member that has an inner diameter that is configured to receive a shaft for mounting the rotatable drive member on a received shaft for rotation about the axis of the received shaft.

23. The rotatable drive pulley of claim 16 wherein anchoring formation means is formed in the outer surface formation means of the sleeve-like member for enhancing the character of the rigid driving connection that is established between the inner metal insert and the molded plastics material of the one-piece plastic member.

24. The rotatable drive member of claim 16 wherein the drive formation means defines drive surface means configured for drivingly engaging a matingly configured drive formation that is defined by another drive element.

25. The rotatable drive member of claim 24 wherein the drive formation means includes drive surface means that is in the form of a toothed surface having a plurality of regularly spaced tooth means for drivingly engaging a matingly configured toothed drive formation on said another drive element.

26. The rotatable drive member of claim 25 wherein the drive surface means is configured to drivingly engage a toothed timing belt, and said another drive element is a toothed timing belt.

27. A timing belt pulley formed from a single, contiguously-extending, one piece member consisting of plastics material that has been injection molded in a two-stage molding process about portions of a preform inner metal insert to provide a rigid structure of plastic and metal components, comprising:
(a) a preform inner metal insert that comprises an elongate tubular sleeve-like piece of metal having an inner surface that defines a hole for receiving a shaft to mount the pulley for rotation about the axis of the shaft, and an outer surface that defines non-circular formation means for drivingly engaging injection molded plastics material;
(b) plastics material injection molded in situ about the outer surface of the preform inner metal insert to form a ring-like rim in the vicinity of the outer edge portions; and,
(c) the plastics material being molded in a two stage molding process with a first stage forming a body of plastics material that extends continuously and contiguously about the inner metal insert, and with a second stage forming a band-like ring of plastics material that extends continuously and contiguously about the product of the first stage molding to define drive formation means extending circumferentially about the rim for drivingly engaging another drive element, with the band like ring of plastics material having a minimum thickness within the range of about forty thousandths of an inch to about ninety thousandths of an inch.

28. The composite rotary drive member of claim 27 wherein the minimum thickness is within the range of about fifty thousandths of an inch to about eighty thousandths of an inch.

29. The composite rotary drive member of claim 27 wherein the peripheral surface portions of the composite preform define an outer surface of the composite preform that is substantially concentric about the axis of rotation.

30. The composite rotary drive member of claim: 27 wherein the plastics materials that are used in the first and second moldings are substantially identical in composition so that when these materials are joined during the second molding to form a single plastics component, there is no line of demarcation on material composition that is marked by the location of the juncture of the plastics materials of the first and second moldings.

31. The composite rotary drive member of claim 30 wherein the plastics material that is used in the first and second moldings is glass fiber reinforced nylon.

32. The composite rotary drive member of claim 30 wherein the glass fiber reinforced nylon material has a shrinkage that is characteristically within the range of about six thousandths of an inch per inch to about nine thousandths of an inch per inch.

33. The timing belt pulley of claim 27 wherein anchoring formation means is provided in the outer surface of the preform inner metal insert for enhancing the character of the rigid driving connection that is established between the preform inner metal insert and the molded plastics material.

34. The timing belt pulley of claim 33 wherein the anchoring formation means includes a plurality of spaced groove segments arranged in at least one ring-like array that extends around the circumference of a selected portion of the outer surface of the preform inner metal insert.

35. A rotatable drive member formed from plastics material that is molded about portions of at least a pair of preform metal insert members which have been formed prior to the molding of the plastics material to provide a rigid drive member structure that consists of plastic and metal components that cooperate to define a hub portion of the drive member that can be mounted on a shaft for rotation about the axis of the shaft, a rim portion of the drive member that extends concentrically about the hub portion at a location spaced radially with respect to the hub portion, and a radially extending web portion of the drive member that rigidly interconnects the hub portion and the rim portion, the drive member comprising:
(a) a preform inner metal insert that comprises elongate tubular means formed from metal for defining at least a part of a hub portion of the rotatable drive member for mounting the drive member on a shaft for rotation about the axis of the shaft, and for defining outer surface formation means of non-circular cross-section extending perimetrically about at least a part of the preform inner metal insert for drivingly engaging such plastics material as may be molded in situ about the outer surface formation means;
(b) a preform outer metal insert that comprises annular disc-like means formed from metal for surrounding portions of the inner metal insert and extending generally coaxially with respect to the tubular means about the axis of the shaft, with the annular disc-like means having inner and outer edge formation means for defining an inner diameter region and an outer diameter region, respectively, of the annular disc-like member, and for drivingly engaging such plastics material as may be molded in situ about the inner and outer edge formation means;
(c) a one-piece plastic member that has been formed from plastics material molded in situ about the outer surface formation means of the preform inner metal insert, and about the inner and outer edge formation means of the preform outer metal insert, with the plastics material enveloping outer surface formation means of the preform inner metal insert and enveloping portions of the inner and outer edge formation means of the preform outer metal insert and making intimate engagement therewith to establish a rigid driving connection between the plastics material of the one-piece plastic member and the inner and outer metal inserts, and with the molded configuration of the one-piece plastic member:

(i) defining a rim portion of the drive member that extends concentrically about the hub portion at a location spaced radially outwardly from the hub portion, and that has drive formation means extending circumferentially about the outer edge formation means for drivingly engaging another drive element; and, (ii) cooperating with the material of the outer metal insert member to define a radially extending web portion that extends between the hub portion and the rim portion, with exposed outer surfaces of the web portion being cooperatively defined in part by outer surface portions of the molded plastics material and by outer surface portions of the preform outer metal insert; and, (d) such portions of the one-piece plastic member as define the rim portion of the drive member being formed in a two-stage molding process wherein:

(i) radially inwardly located parts of the rim portion are formed as the result of a first injection molding of plastics material that forms a composite preform that includes plastics material that rigidly drivingly engages the at least one metal component, and that defines an outer surface that extends coaxially about the mounting formation at a substantially uniform distance from the axis of rotation, which distance will be referred to as a "second radius," with the second radius being selected such that it is less than the first radius by a distance that is within the range of about forty thousandths of an inch to about ninety thousandths of an inch;

(ii) the remainder of the rim portion is formed as the result of a second injection molding of plastics material that provides a band-like ring of plastics material that extends continuously and contiguously about, and is intimately bonded to, the outer surface of the composite preform with the result that the plastics material of the first and second injection moldings unite to form a single component of plastics material, with the bandlike ring of plastics material that is provided by the second molding being molded at a time after the plastics material of the composite preform has undergone shrinkage that occurs during its solidification, and with the plastics material of the second molding serving to define a drive surface of desired shape and size.

36. The rotatable drive member of claim 35 wherein the outer metal insert is formed as an annular disk-like stamping from a sheet of metal, with the disk-like stamping having inner and outer diameter regions that are interconnected by substantially planar radially extending portions, and with the inner and outer diameter regions of the disk-like stamping being bent out of the plane of the radially extending portions.

37. The rotatable drive member of claim 35 wherein:
(a) the preform inner metal insert includes a sleeve-like member that has an inner diameter that is configured to receive a shaft for mounting the rotatable drive member on a received shaft for rotation about the axis of the received shaft;

(b) the inner edge formation means of the annular disc-like means surrounds and extends into proximity with the outer surface formation means of the sleeve-like member; and, (c) the molded plastics material of the one-piece plastic member extends about the outer surface formation means of the sleeve-like member and about the inner edge formation means of the annular disc-like means to establish rigid driving connections among the the one-piece plastic member, the preform inner metal insert and the preform outer metal insert.

38. The rotatable drive member of claim 37 wherein anchoring formation means is formed in the outer surface formation means of the sleeve-like member for enhancing the character of the rigid driving connection that is established between the sleeve-like member and the molded plastics material of the one-piece plastic member.

39. The rotatable drive member of claim 35 wherein the drive formation means defines drive surface means configured for drivingly engaging a matingly configured drive formation that is defined by another drive element.

40. The rotatable drive member of claim 39 wherein the drive formation means includes drive surface means that is in the form of a toothed surface having a plurality of regularly spaced tooth means for drivingly engaging a matingly configured toothed drive formation on said another drive element.

41. The rotatable drive member of claim 40 wherein the drive surface means is configured to drivingly engage a toothed timing belt, and said another drive element is a toothed timing belt.

42. The rotatable drive member of claim 35 wherein the outer edge formation means of the annular disc-like means define anchoring formation means for enhancing the character of the rigid driving connection that is established between the outer edge formation means and such portions of the plastics material.

43. The rotatable drive member of claim 42 wherein the anchoring formation means includes a plurality of notch formations located at spaced positions about peripheral portions of the disc-like means.

44. The rotatable drive member of claim 42 wherein the anchoring formation means includes a plurality of openings formed through edge portions of the annular disc-like means.

45. The rotatable drive member of claim 35 additionally including hole means formed through portions of the annular disc-like means that define portions of the radially extending web for connecting the rotary drive member to an adjacent rotary drive component.

46. A rotatable drive pulley formed from plastics material that is molded about portions of inner and outer metal inserts that have been formed prior to the molding of the plastics material, comprising:

(a) a preform inner metal insert that comprises an elongate tubular sleeve-like piece of metal having an inner surface that defines a hole for receiving a shaft to mount the drive member for rotation about the axis of the shaft, and an outer surface that defines non-circular formation means for drivingly engaging injection molded plastics material;

(b) a preform outer metal insert that comprises an annular disc-like member that is formed by stamping a blank of sheet metal such that inner and outer edge portions of the blank which define the inner and outer diameter of the annular disc-like member are bent out of the plane of the remainder of the sheet metal blank, with the preform outer metal insert extending about the outer surface of the preform inner metal insert but with the inner edge portions of the preform outer metal insert spaced from the outer surface of the preform inner metal insert, and with said plane of the remainder of the blank extending substantially orthogonally with respect to the axis of the shaft about which the preform inner metal insert mounts the drive member for rotation;

(c) a one-piece member that has been formed from plastics material injection molded in situ about the outer surface of the preform inner metal insert, and about the inner and outer edge portions of the preform outer metal insert, with the plastics material cooperating with the preform inner metal insert to form hub means for extending about the shaft, and cooperating with the preform outer metal insert to form ring-like rim means that extends coaxially about the hub means in radially spaced relationship thereto in the vicinity of the outer edge portions;

(d) A rotatable drive member formed from plastics material that is molded about portions of at least a pair of preform metal insert members which have been formed prior to the molding of the plastics material to provide a rigid drive member structure that consists of plastic and metal components that cooperate to define a hub portion of the drive member that can be mounted on a shaft for rotation about the axis of the shaft, a rim portion of the drive member that extends concentrically about the hub portion at a location spaced radially with respect to the hub portion, and a radially extending web portion of the drive member that rigidly interconnects the hub portion and the rim portion, the drive member comprising (i) a preform inner metal insert that comprises elongate tubular means formed from metal for defining at least a part of a hub portion of the rotatable drive member for mounting the drive member on a shaft for rotation about the axis of the shaft, and for defining outer surface formation means of non-circular cross-section extending perimetrically about at least a part of the preform inner metal insert for drivingly engaging such plastics material as may be molded in situ about the outer surface formation means;

(ii) a preform outer metal insert that comprises annular disc-like means formed from metal for surrounding portions of the inner metal insert and extending generally coaxially with respect to the tubular means about the axis of the shaft, with the annular disc-like means having inner and outer edge formation means for defining an inner diameter region and an outer diameter region, respectively, of the annular disc-like member, and for drivingly engaging such plastics material as may be molded in situ about the inner and outer edge formation means;

(iii) a one-piece plastic member that has been formed from plastics material molded in situ about the outer surface formation means of the preform inner metal insert, and about the inner and outer edge formation means of the preform outer metal insert, with the plastics material enveloping outer surface formation means of the preform inner metal insert and enveloping portions of the inner and outer edge formation means of the preform outer metal insert and making intimate engagement therewith to establish a rigid driving connection between the plastics material of the one-piece plastic member and the inner and outer metal inserts, and with the molded configuration of the one-piece plastic member:

(1) defining a rim portion of the drive member that extends concentrically about the hub portion at a location spaced radially outwardly from the hub portion, and that has drive formation means extending circumferentially about the outer edge formation means for drivingly engaging another drive element; and, (2) cooperating with the material of the outer metal insert member to define a radially extending web portion that extends between the hub portion and the rim portion, with exposed outer surfaces of the web portion being cooperatively defined in part by outer surface portions of the molded plastics material and by outer surface portions of the preform outer metal insert; and, (iv) such portions of the one-piece plastic member as define the rim portion of the drive member being formed in a two-stage molding process wherein:

(1) radially inwardly located parts of the rim portion are formed as the result of a first injection molding of plastics material that forms a composite preform that includes plastics material that rigidly drivingly engages the at least one metal component, and that defines an outer surface that extends coaxially about the mounting formation at a substantially uniform distance from the axis of rotation, which distance will be referred to as a "second radius," with the second radius being selected such that it is less than the first radius by a distance that is within the range of about forty thousandths of an inch to about ninety thousandths of an inch;

(2) the remainder of the rim portion is formed as the result of a second injection molding of plastics material that provides a band-like ring of plastics material that extends continuously and contiguously about, and is intimately bonded to, the outer surface of the composite preform with the result that the plastics material of the first and second injection moldings unite to form a single component of plastics material, with the band-like ring of plastics material that is provided by the second molding being molded at a time after the plastics material of the composite preform has undergone shrinkage that occurs during its solidification, and with the plastics material of the second molding serving to define a drive surface of desired shape and size;

(e) drive formation means defined by the plastics material and extending circumferentially about the rim means for drivingly engaging another drive element 47. The rotatable drive pulley of claim 46 wherein the outer metal insert is formed as an annular disk-like stamping from a sheet of metal, with the disk-like stamping having inner and outer edge formation means that are interconnected by substantially planar radially extending portions, and with the inner and outer edge formation means of the disk-like stamping being bent out of the plane of the radially extending portions.

48. The rotatable drive pulley of claim 47 wherein:

(a) the preform inner metal insert includes a sleeve-like member that has an inner diameter that is configured to receive a shaft for mounting the rotatable drive pulley for rotation about the axis of the shaft, and having an outer diameter;

(b) the inner edge formation means of the outer metal insert surround and extend into proximity with the outer diameter of the inner metal insert; and, (c) the inner portion of the molded plastics material extends about the outer diameter of the preform inner metal insert and about the inner edge portions of the preform outer metal insert to establish rigid driving connections among the plastics material and the inner and outer metal inserts 49. The rotatable drive pulley of claim 48 wherein anchoring formation means is formed in the outer surface formation means of the sleeve-like member for enhancing the character of the rigid driving connection that is established between the inner metal insert and the molded plastics material of the one-piece plastic member.

50. The rotatable drive pulley of claim 47 wherein the drive formation means defines drive surface means configured for drivingly engaging a matingly configured drive formation that is defined by another drive member.

51. The rotatable drive pulley of claim 50 wherein the drive formation means includes drive surface means that is in the form of a toothed surface having a plurality of regularly spaced tooth means for drivingly engaging a matingly configured toothed drive formation on said another drive element.

52. The rotatable drive pulley of claim 51 wherein the drive surface means is configured to drivingly engage a toothed timing belt, and said another drive element is a toothed timing belt.

53. The rotatable drive pulley of claim 47 wherein the outer edge formation means of the preform outer metal insert define anchoring formation means for enhancing the character of the rigid driving connection that is established between the outer edge formation means and such portions of the plastics material.

54. The rotatable drive pulley of claim 53 wherein the anchoring formation means includes a plurality of notch formations located at spaced positions about peripheral portions of the preform outer metal insert.

55. The rotatable drive pulley of claim 53 wherein the anchoring formation means includes a plurality of openings formed through edge portions of the preform outer metal insert.

56. The rotatable drive pulley of claim 47 additionally including hole means formed through portions of the outer metal insert that define portions of the radially extending web for connecting the rotary drive pulley to an adjacent rotary drive component.

57. A method of forming a composite rotary drive member from metal and plastics components, with the composite rotary drive member having a circumferentially extending drive formation that is defined by plastics material that has been molded to define drive features of desired shape and size, comprising the steps of:

(a) providing metal component means including at least one metal component that has mounting formation means for mounting the composite rotary drive member for rotation about an axis of rotation;

(b) injection molding thermoplastics material about selected portions of the metal component to provide a composite preform member that is a rigid, one-piece composite of metal and plastics components, with the plastics component having peripheral portions that approach but stop short of a location, as measured radially relative to the axis of rotation, wherein a circumferentially extending drive formation is to be defined that has drive features of desired shape and size, and permitting the injection molded thermoplastics material of the composite preform member to undergo such shrinkage as occurs during its solidification;

(c) injection molding thermoplastics material about the peripheral portions of the composite preform member to complete the formation of the composite rotary drive member and to provide a band-like ring of plastics material that extends about the peripheral portions of the composite preform to define a circumferentially extending drive formation that has drive features of desired shape and size at said location for drivingly engaging another drive element as the rotary drive member rotates about the axis of rotation, with the plastics material of the band-like ring extending in an uninterrupted manner continuously and contiguously about the peripheral portions of the composite preform such that the plastics materials of the first and second injection moldings are united during the second molding to form a single component of plastics material, with the band-like ring of plastics material that is provided by the second molding being molded at a time after the plastics material of the first molding has undergone shrinkage that occurs during its solidification, and with the band-like ring of plastics material that is provided by the second molding having a minimum thickness that is within the range of about forty thousandths of an inch to about ninety thousandths of an inch.

58. The method of claim 57 wherein the step of injection molding thermoplastics material about the peripheral portions of the preform to complete the formation of the composite rotary drive member includes the step of forming the band-like ring of plastics material such that it has a minimum thickness that is within the range of about fifty thousandths of an inch to about eighty thousandths of an inch.

59. A composite rotary drive element that is formed by the method of claim 58.

60. The method of claim 57 wherein the step of injection molding thermoplastics material about selected portions of the metal component to provide a composite preform member includes the step of forming the peripheral portions of the composite preform member to define an outer surface of the composite preform that is substantially concentric about the axis of rotation.

61. A composite rotary drive element that is formed by the method of claim 60.

62. The method of claim 57 wherein the injection molding steps include using plastics materials that are of substantially identical in composition so that where these materials join as the result of the step of injection molding thermoplastics material about the peripheral portions of the preform to complete the formation of the composite rotary drive member, there is no line of demarcation in material composition at the juncture of the plastics materials.

63. The method of claim 62 wherein the injection molding steps include using a plastics material comprised of glass fiber reinforced nylon.

64. The method of claim 63 wherein the injection molding steps include using a plastics material comprised of glass fiber reinforced nylon material has a shrinkage that is characteristically within the range of about six thousandths of an inch per inch to about nine thousandths of an inch per inch.

65. A composite rotary drive element that is formed by the method of claim 64.

66. A composite rotary drive element that is formed by the method of claim 63.

67. A composite rotary drive element that is formed by the method of claim 62.

68. The method of claim 57 wherein the step of injection molding thermoplastics material about the peripheral portions of the preform to complete the formation of the composite rotary drive member includes the step of forming the circumferentially extending drive formation such that it defines a toothed surface having a plurality of regularly spaced tooth means for drivingly engaging a matingly configured toothed drive formation on said another drive element.

69. A composite rotary drive element that is formed by the method of claim 68.

70. The method of claim 57 wherein the step of injection molding thermoplastics material about the peripheral portions of the preform to complete the formation of the composite rotary drive member includes the step of forming the circumferentially extending drive formation such that it defines a toothed surface having a plurality of regularly spaced tooth means for drivingly engaging said another drive element that is in the form of a toothed timing belt.

71. A composite rotary drive element that is formed by the method of claim 70.

72. A composite rotary drive element that is formed by the method of claim 57.

* * * * *